(12) United States Patent
Lutke

(10) Patent No.: US 9,534,902 B2
(45) Date of Patent: Jan. 3, 2017

(54) TIME PHASED IMAGERY FOR AN ARTIFICIAL POINT OF VIEW

(75) Inventor: Kevin R. Lutke, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 493 days.

(21) Appl. No.: 13/105,306

(22) Filed: May 11, 2011

(65) Prior Publication Data

US 2012/0287275 A1 Nov. 15, 2012

(51) Int. Cl.
*H04N 7/18* (2006.01)
*G01C 22/00* (2006.01)
*G01C 21/20* (2006.01)
*G05D 1/00* (2006.01)

(52) U.S. Cl.
CPC ........... *G01C 21/206* (2013.01); *G05D 1/0038* (2013.01)

(58) Field of Classification Search
CPC ............................ G01C 21/206; G05D 1/0038
USPC ........................ 348/148, 113–120; 701/2, 11
See application file for complete search history.

(56) References Cited

U.S. PATENT DOCUMENTS

| 8,263,919 B2* | 9/2012 | Murphy | F42B 12/365 244/147 |
|---|---|---|---|
| 2007/0165033 A1 | 7/2007 | Matsuno et al. | |
| 2008/0205706 A1 | 8/2008 | Hongo | |
| 2009/0076665 A1 | 3/2009 | Hoisington et al. | |
| 2009/0140881 A1* | 6/2009 | Sakai | G08G 1/164 340/901 |
| 2009/0167786 A1 | 7/2009 | Stanions et al. | |
| 2010/0066825 A1* | 3/2010 | Kuboyama | G06K 9/00812 348/118 |
| 2010/0292868 A1* | 11/2010 | Rotem | G06T 7/2033 701/2 |
| 2011/0049290 A1 | 3/2011 | Seydoux et al. | |
| 2011/0109618 A1* | 5/2011 | Nowak | G01C 21/3647 345/419 |

OTHER PUBLICATIONS

Sugimoto, M, "Time Follower's Vision: a teleoperation interface with past images", Computer Graphics and Applications, IEEE, Issue Date: Jan.-Feb. 2005, vol. 25 Issue:1, pp. 54-63, available at httQ:/iieeexQlore.ieee.org/xQls/abs all.jsQ?arnumber=1381226 &tag=1.*
Extended European Search Report, dated Feb. 28, 2014, regarding Application No. EP12167730.6, 5 pages.
European Patent Office Communication, dated Apr. 14, 2016, regarding Application No. EP12167730.6, 5 pages.
Kalkofen et al., "Comprehensible Visualization for Augmented Reality," IEEE Transactions on Visualization and computer Graphics, vol. 15, No. 2, Mar./Apr. 2009, pp. 193-204.

* cited by examiner

*Primary Examiner* — Nhon Diep
*Assistant Examiner* — Tsion B Owens
(74) *Attorney, Agent, or Firm* — Yee & Associates, P.C.

(57) ABSTRACT

A method and apparatus for processing video information for a vehicle. A number of prior images is selected from images generated by the vehicle. An object is seen in the number of prior images. A model of the vehicle is displayed in the number of prior images in a current position of the vehicle and with a size that is based on the current position of the vehicle relative to the object in the number of prior images.

19 Claims, 12 Drawing Sheets

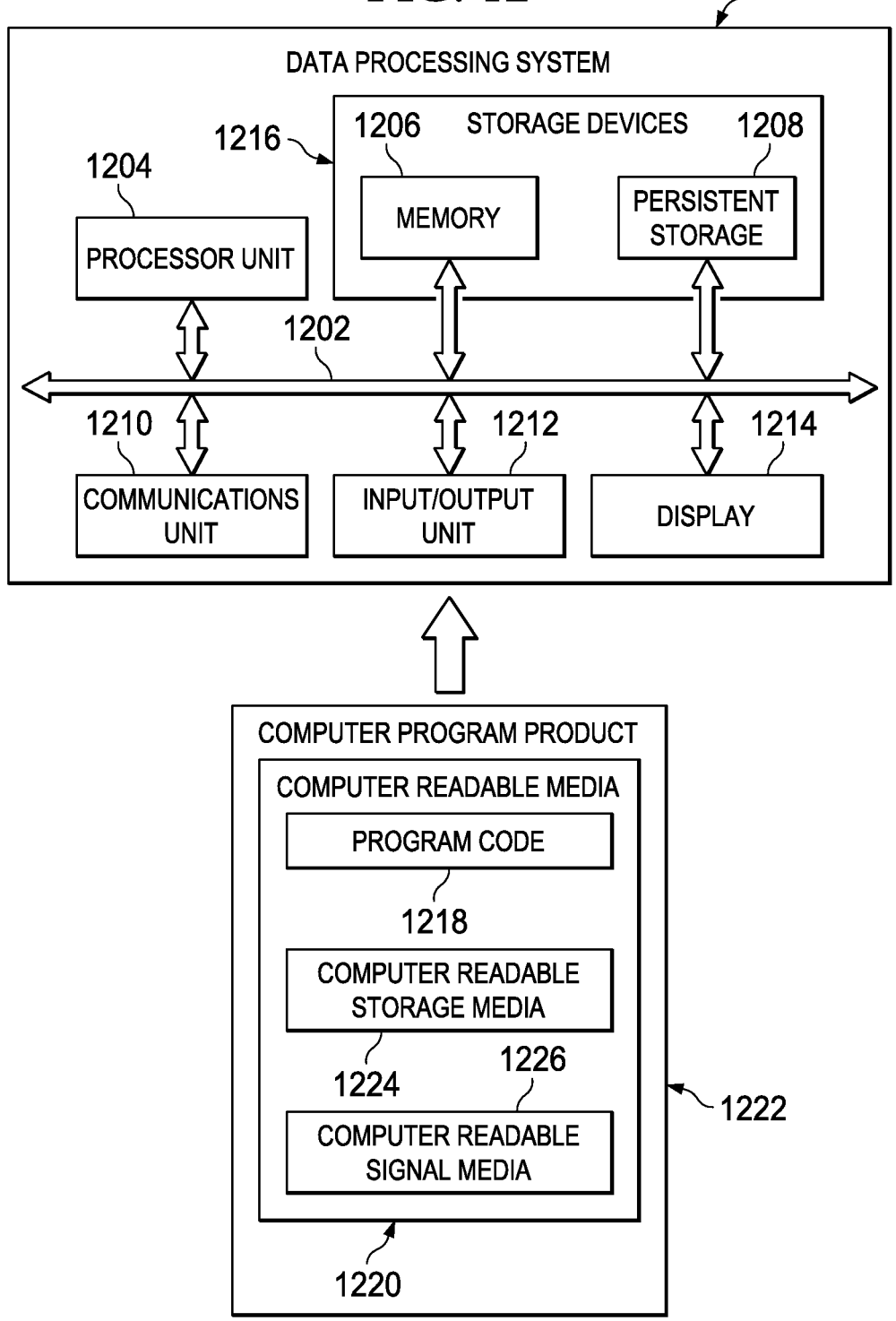

TIME PHASED IMAGERY FOR AN ARTIFICIAL POINT OF VIEW

BACKGROUND INFORMATION

1. Field

The present disclosure relates generally to vehicles and, in particular, to operating vehicles. Still more particularly, the present disclosure relates to a method and apparatus for providing navigation information to operate an unmanned vehicle.

2. Background

Unmanned vehicles are used for a number of different functions. Remote sensing is one use for unmanned vehicles. For example, unmanned aerial vehicles may be used to perform geophysical surveys, surveillance, generate images of terrain for maps, generate images of objects, track movement of objects, monitor fires, carry and deliver payloads, and other suitable functions.

Some unmanned vehicles may follow preset paths or fly within predefined areas without the need for input from a human operator. Other unmanned aerial vehicles are operated by a human operator located at a remote location to perform these different functions.

In one method of controlling an unmanned aerial vehicle, the human operator sees images sent back by the unmanned aerial vehicle for use in operating the unmanned aerial vehicle. These images typically take the form of video data streams that provide the operator with a point of view from the unmanned aerial vehicle. Additionally, the operator also may rely on a global positioning system receiver, a star tracker, an inertial navigation system (INS), or other systems on the unmanned aerial vehicle to provide a location of the unmanned aerial vehicle.

Flying an unmanned aerial vehicle may be challenging in some environments. For example, inclement weather, other aircraft, and/or terrain at lower altitudes may make flying an unmanned aerial vehicle more challenging as compared to an open airspace that has no obstacles.

Therefore, it would be advantageous to have a method and apparatus that takes into account at least some of the issues discussed above, as well as other possible issues.

SUMMARY

In one advantageous embodiment, a method for processing video information for a vehicle is provided. A number of prior images is selected from images generated by the vehicle. An object is seen in the number of prior images. A model of the vehicle is displayed in the number of prior images in a current position of the vehicle and with a size that is based on the current position of the vehicle relative to the object in the number of prior images.

In another advantageous embodiment, an apparatus comprises a display device and a computer system. The computer system is configured to select a number of prior images from images generated by the vehicle. An object is seen in the number of prior images. The computer system is further configured to display a model of the vehicle in the number of prior images in a current position of the vehicle and with a size that is based on the current position of the vehicle relative to the object in the number of prior images.

In yet another advantageous embodiment, a computer program product comprises a computer readable storage medium, first program code, and second program code. The first program code is for selecting a number of prior images from images generated by a vehicle. An object is seen in the number of prior images. The second program code is for displaying a model of the vehicle in the number of prior images in a current position of the vehicle and with a size that is based on the current position of the vehicle relative to the object in the number of prior images. The first program code and the second program code are stored on the computer readable storage medium.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 12 is an illustration of a data processing system in accordance with an advantageous embodiment.

DETAILED DESCRIPTION

Figure 1:
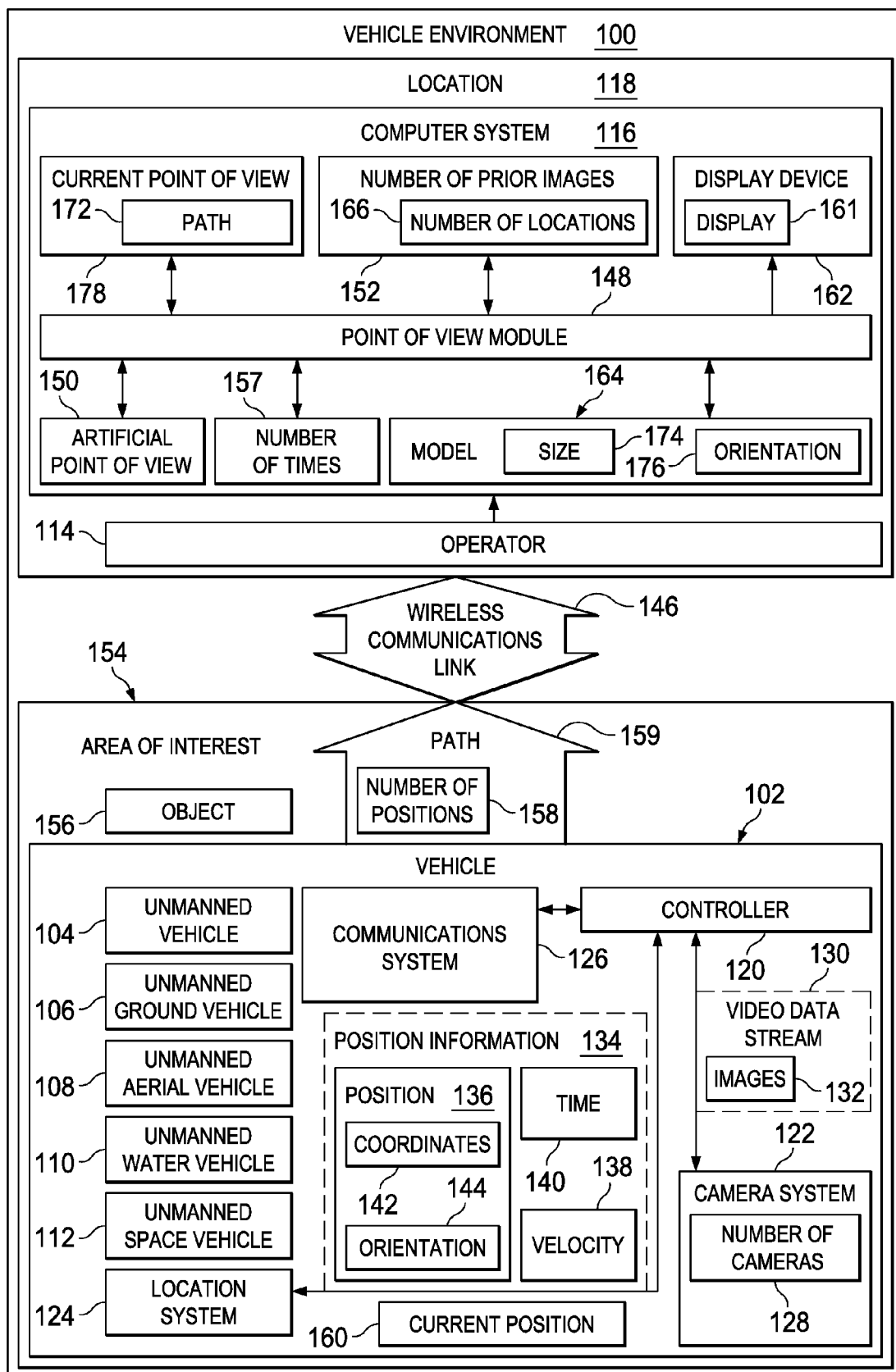
FIG. 1 is an illustration of a block diagram of a vehicle environment in accordance with an advantageous embodiment.

The different advantageous embodiments recognize and take into account a number of different considerations. In these illustrative examples, the use of "a number" with reference to items, means one or more items. For example, "a number of considerations" is one or more considerations.

The different advantageous embodiments recognize and take into account that flying an unmanned aerial vehicle at a lower altitude may result in the unmanned aerial vehicle encountering obstacles. These obstacles may take the form of objects and create additional challenges for operating the unmanned aerial vehicle.

For example, the different advantageous embodiments recognize and take into account that flying an unmanned aerial vehicle through a forest, under a bridge, or through a city is more challenging than flying an unmanned aerial vehicle at an altitude at which these objects are not present. Video data streams and positioning information received from an unmanned aerial vehicle may not provide as much information as desired to operate the unmanned aerial vehicle in challenging types of environments.

The different advantageous embodiments recognize and take into account that another situation in which operating an unmanned aerial vehicle may be more challenging involves flying an unmanned aerial vehicle into the interior of an object, such as a building. It may be desirable to obtain information about the interior of the building before sending a person into the building. For example, with bomb disposal processes, it is often desirable to send an unmanned aerial vehicle into the building to obtain information about a potential explosive device that may be located inside the building.

The different advantageous embodiments recognize and take into account that the operator may have sufficient information to move the object into the building when the operator of the unmanned aerial vehicle has a line of sight to the unmanned aerial vehicle and the building. For example, the operator may have sufficient information about the environment around the unmanned aerial vehicle to fly the unmanned aerial vehicle through a doorway and into the building.

However, the different advantageous embodiments recognize and take into account that an operator may not always have a line of sight to the unmanned aerial vehicle. When this situation is present, the different advantageous embodiments recognize and take into account that the current camera systems and other devices may not provide the operator of the unmanned aerial vehicle with a desired level of situational awareness. In other words, the different advantageous embodiments recognize and take into account that the operator of the unmanned aerial vehicle may not be able to see as much of the environment around the vehicle as desired with currently-used cameras systems.

The different advantageous embodiments recognize and take into account that a camera in an unmanned aerial vehicle may be used to enter a building to obtain information about the interior of the building. However, the camera may not provide sufficient information about the doorway. As another example, the different advantageous embodiments may be applied to aircraft at higher altitudes. For example, the different advantageous embodiments may be implemented in an aircraft at altitudes at which the aircraft may encounter other aircraft, enemy weapons, and/or other hazards. Further, the different advantageous embodiments also may be implemented in manned aircraft as an additional feature to aid in avoiding obstacles.

For example, the advantageous embodiments recognize and take into account that the information provided by the camera may not provide as much information as desired to maneuver around objects that may be present. With a forward facing camera, the camera may be unable to provide information about the clearance on either side of the unmanned aerial vehicle as the unmanned aerial vehicle flies through a doorway.

As a result, the different advantageous embodiments recognize and take into account that the operator may be unable to accurately determine whether the unmanned aerial vehicle may be able to fly through a doorway without actually touching the doorway. For example, the camera may not provide a desired amount of information about the relative positioning of the camera with respect to the doorway. In other words, the view provided by the camera may not provide enough information about the positioning of the camera with respect to the different portions of the doorway.

The different advantageous embodiments recognize and take into account that one manner in which additional information may be obtained is to use a 360 degree camera or a fish-eye camera. Images from these types of cameras may provide a better idea of the environment around the unmanned aerial vehicle. The different advantageous embodiments recognize and take into account, however, that even with this type of view, the operator may still not have sufficient information to operate the unmanned aerial vehicle in a desired manner. The images may be distorted from what the operator would like to see and may be more difficult to interpret. In other words, the images may not provide the information desired with respect to the positioning of the camera relative to different objects or features of objects around the camera.

Thus, the different advantageous embodiments provide a method and apparatus for providing additional information about the environment around an unmanned aerial vehicle. The different advantageous embodiments provide time phase imagery for an artificial point of view for vehicles. In one advantageous embodiment, a process is present for processing video information of a vehicle. A number of prior images that includes an object is selected from images generated by the vehicle. A model of the vehicle is displayed in the number of prior images in a current position of the vehicle. Further, the vehicle is displayed with a size that is based on the current position of the vehicle relative to an object in the number of prior images.

With reference now to FIG. 1, an illustration of a block diagram of a vehicle environment is depicted in accordance with an advantageous embodiment. In vehicle environment 100, vehicle 102 takes the form of unmanned vehicle 104. Unmanned vehicle 104 may be, for example, unmanned ground vehicle 106, unmanned aerial vehicle 108, unmanned water vehicle 110, and unmanned space vehicle 112. In these illustrative examples, vehicle 102 is operated by operator 114 at computer system 116 in location 118. Location 118 is a location remote to vehicle 102.

In these illustrative examples, vehicle 102 is comprised of different components. Some of these components include, for example, controller 120, camera system 122, location system 124, and communications system 126.

Controller 120 is a hardware device and may include software. Controller 120 is configured to control operation of vehicle 102. Controller 120 may receive instructions from operator 114 at computer system 116. Operator 114 is a human operator, such as a pilot or other operator, when vehicle 102 takes the form of unmanned aerial vehicle 108. These instructions may be received through communications system 126 in these depicted examples.

For example, controller 120 may control the movement of vehicle 102, as well as other functions. Controller 120, in these examples, is in communication with camera system 122, location system 124, and communications system 126.

Controller 120 may be implemented using a number of different types of hardware. For example, controller 120 may be an application specific integrated circuit, a processor unit, a computer, and/or other suitable types of hardware.

Camera system 122 comprises number of cameras 128. In the illustrative examples, number of cameras 128 may include different types of cameras. For example, without limitation, number of cameras 128 includes at least one of a visible light camera, an infrared camera, a stereo camera, a light detection and ranging camera, and some other suitable types of camera.

As used herein, the phrase "at least one of", when used with a list of items, means that different combinations of one or more of the listed items may be used, and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

Number of cameras 128 in camera system 122 may take individual images for photos, images for video, or a combination of the two. Camera system 122 also may generate video data stream 130 from images 132 generated by number of cameras 128. Video data stream 130 also may include information about images 132 or information about the generation of images 132.

For example, video data stream 130 also may include timestamps, positions, camera settings, and other information. This information may be included in the images or may be separate pieces of information. This type of information may be referred to as metadata.

Location system 124 generates position information 134. In these illustrative examples, location system 124 may be implemented using a number of different types of devices. For example, location system 124 may comprise at least one of a global positioning system receiver, an accelerometer, an inertial measurement unit, and/or some other suitable type of device.

Position information 134 includes, for example, without limitation, position 136, velocity 138, time 140, and other suitable information about the position of vehicle 102. Further, position 136 may include coordinates 142 and orientation 144.

Coordinates 142 describe the location of vehicle 102. Coordinates 142 may be in any suitable coordinate system. For example, coordinates 142 may be latitude, longitude, and altitude. Of course, other coordinate systems, such as a polar coordinate system, may be used, as well as arbitrary coordinate systems, depending on the particular implementation.

Orientation 144 describes the orientation of vehicle 102. Orientation 144 may include, for example, an angular position, attitude, or other information about the positioning of vehicle 102. For example, orientation 144 may be used to identify where the front of vehicle 102 is pointed.

Communications system 126 is configured to provide vehicle 102 communications with other hardware devices that may be located remotely to vehicle 102. This communication occurs over wireless communications link 146 in these illustrative examples.

For example, camera system 122 may send images 132 in video data stream 130 to computer system 116 over wireless communications link 146. In a similar fashion, location system 124 may send position information 134 to computer system 116 over wireless communications link 146.

As depicted, point of view module 148 is located in computer system 116 at location 118. Point of view module 148 may be comprised of hardware, software, or a combination of the two.

Point of view module 148 uses video data stream 130 and position information 134 to generate artificial point of view 150 for operator 114. With artificial point of view 150, operator 114 may be able to more easily control the operation of vehicle 102 when moving vehicle 102 around or into object 156.

Point of view module 148 selects number of prior images 152 from images 132 in video data stream 130. Number of prior images 152 includes area of interest 154 around vehicle 102. In this illustrative example, object 156 is presented using number of prior images 152. In other words, object 156 may be seen in number of prior images 152 in these illustrative examples.

In the illustrative examples, number of prior images 152 is generated at number of positions 158 for vehicle 102. Number of positions 158 is one or more positions for vehicle 102 at one or more prior times to current position 160 on path 159 for vehicle 102.

Point of view module 148 is configured to display artificial point of view 150 in display 161 on display device 162 in these illustrative examples. Artificial point of view 150 is a point of view that is not seen by operator 114 in images 132 generated by camera system 122 at current position 160 of vehicle 102. Instead, artificial point of view 150 is provided from a prior position other than current position 160. This position may be, for example, one or more of number of positions 158.

Point of view module 148 adds model 164 of vehicle 102 to number of prior images 152 to form a number of modified images. Point of view module 148 displays the number of modified images on display 161. The display of model 164 in number prior images 152 is in number of locations 166 in number of prior images 152. Number of locations 166 is one or more locations in number of prior images 152 that correspond to current position 160 of vehicle 102 from the number of point of views at number of locations 166.

In other words, model 164 is displayed in number of prior images 152 at number of locations 166 in the images that operator 114 would see if operator 114 or a camera were located at artificial point of view 150 at the current time with vehicle 102 being in current position 160.

A point of view is a view point from the perspective of a viewer, such as operator 114. Typically, the view point is from vehicle 102 and, in particular, from a camera in number of cameras 128 in vehicle 102. Images generated at a point of view by a camera are what the camera sees at that point of view.

In the different illustrative examples, artificial point of view 150 is generated to provide operator 114 a point of view from a position in which a camera is not present. Artificial point of view 150 may be created at number of positions 158 on path 159 that vehicle 102 has traveled through. Thus, operator 114 may see a view of current position 160 of vehicle 102 from a position at which vehicle 102 is no longer present using point of view module 148. This view may aid operator 114 in controlling movement of vehicle 102.

In these illustrative examples, number of prior images 152 may be selected as images taken at number of positions 158. Artificial point of view 150 may be generated using any of number of positions 158 along path 159 for which number of prior images 152 are present in these depicted examples. In other words, artificial point of view 150 is based on the point or position at which the camera was at when the image was generated. Of course, artificial point of view 150 also may be one based on shifting the point of view relative to the point of view of the camera.

In some illustrative examples, number of prior images 152 may be selected as images taken at number of times 157. Number of times 157 may be times prior to a current time for vehicle 102. For example, a prior image may be selected as an image taken at about five seconds prior to a current time for vehicle 102.

In these illustrative examples, number of positions 158 and/or number of times 157 may be changed during operation of vehicle 102 as vehicle 102 travels along path 159. In other words, number of positions 158 and/or number of times 157 for which number of prior images 152 are selected may be changed by operator 114 to change artificial point of view 150.

Also, model 164 is displayed with size 174. Size 174 is based on current position 160 of vehicle 102 relative to object 156 as seen in number of prior images 152. In other words, size 174 of model 164 in number of prior images 152 has a proportion relative to object 156 in number of prior images 152 that substantially matches the actual physical proportion of vehicle 102 relative to object 156. For example, if vehicle 102 has one foot of clearance from object 156, size 174 is selected such that vehicle 102 is displayed in number of prior images 152 with the appropriate scale or proportionality for that clearance in number of prior images 152. In addition, model 164 is displayed with orientation 176 that is selected to match orientation 144 of vehicle 102 at current position 160.

In these illustrative examples, if number of prior images 152 is a single image, model 164 may be displayed such that model 164 moves based on the movement of vehicle 102. In other words, as current position 160 changes for vehicle 102, the location of model 164 in the image also moves in display 161 on display device 162 to provide a correct representation of vehicle 102.

Additionally, size 174 and orientation 176 of model 164 are changed as needed. The change is made to provide as accurate a representation as possible of vehicle 102 in current position 160 from artificial point of view 150 to operator 114. Number of prior images 152 may have a number large enough to provide a video or a desired point of view for displaying model 164 in number of prior images 152.

In these illustrative examples, point of view module 148 may shift artificial point of view 150 in a number of different ways. The shifting of artificial point of view 150 may be made through user input from operator 114 at computer system 116. Point of view module 148 may provide different points of view that are used to generate artificial point of view 150. These different points of view may be based on number of prior images 152 that are generated along number of positions 158 on path 159 of vehicle 102.

Also, point of view module 148 may provide a shifting of artificial point of view 150 from a selected position in number of positions 158 on path 159 to other positions and/or to current point of view 178 at current position 160 on path 172. Current point of view 178 is seen through images 132 in video data stream 130 for current position 160.

Further, number of prior images 152 may be used to generate a three-dimensional view when camera system 122 has more than one camera, and those cameras are arranged and/or configured to provide stereo and/or three-dimensional views. In this manner, improved depth perception may be provided to operator 114 about vehicle environment 100. In particular, operator 114 may be more able to perceive the positioning of vehicle 102 relative to object 156 for maneuvering vehicle 102 around, through, or into object 156.

In this manner, increased information about the environment around vehicle 102 may be obtained for operator 114 of unmanned vehicle 104. Operator 114 may send commands to vehicle 102 to move vehicle 102 to object 156 in a manner that may avoid undesired contact with object 156. In some cases, contact with object 156 may be desired, and operator 114 may move vehicle 102 to provide the contact with object 156.

For example, if object 156 is a doorway, by providing display 161 of model 164 for vehicle 102 in current position 160 in number of prior images 152, operator 114 may have more information to operate vehicle 102. For example, operator 114 may be able to see whether vehicle 102 may contact the doorway and may guide vehicle 102 to pass through the doorway without touching the doorway. Touching the doorway may cause damage to portions of vehicle 102 and/or may render vehicle 102 inoperative.

The illustration of vehicle environment 100 in FIG. 1 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, vehicle 102 may be a manned vehicle in which operator 114 and computer system 116 are located in vehicle 102. With this type of implementation, operator 114 may not have an external view from vehicle 102 to allow for a desired amount of information about the environment around vehicle 102.

In yet other illustrative examples, other display devices, in addition to display device 162, may be present to provide information to operator 114. Additional display devices may provide displays from different points of view. In this manner, operator 114 may be able to see an artificial point of view from different locations in number of positions 158 in path 159 at the same time if desired.

Figure 2:
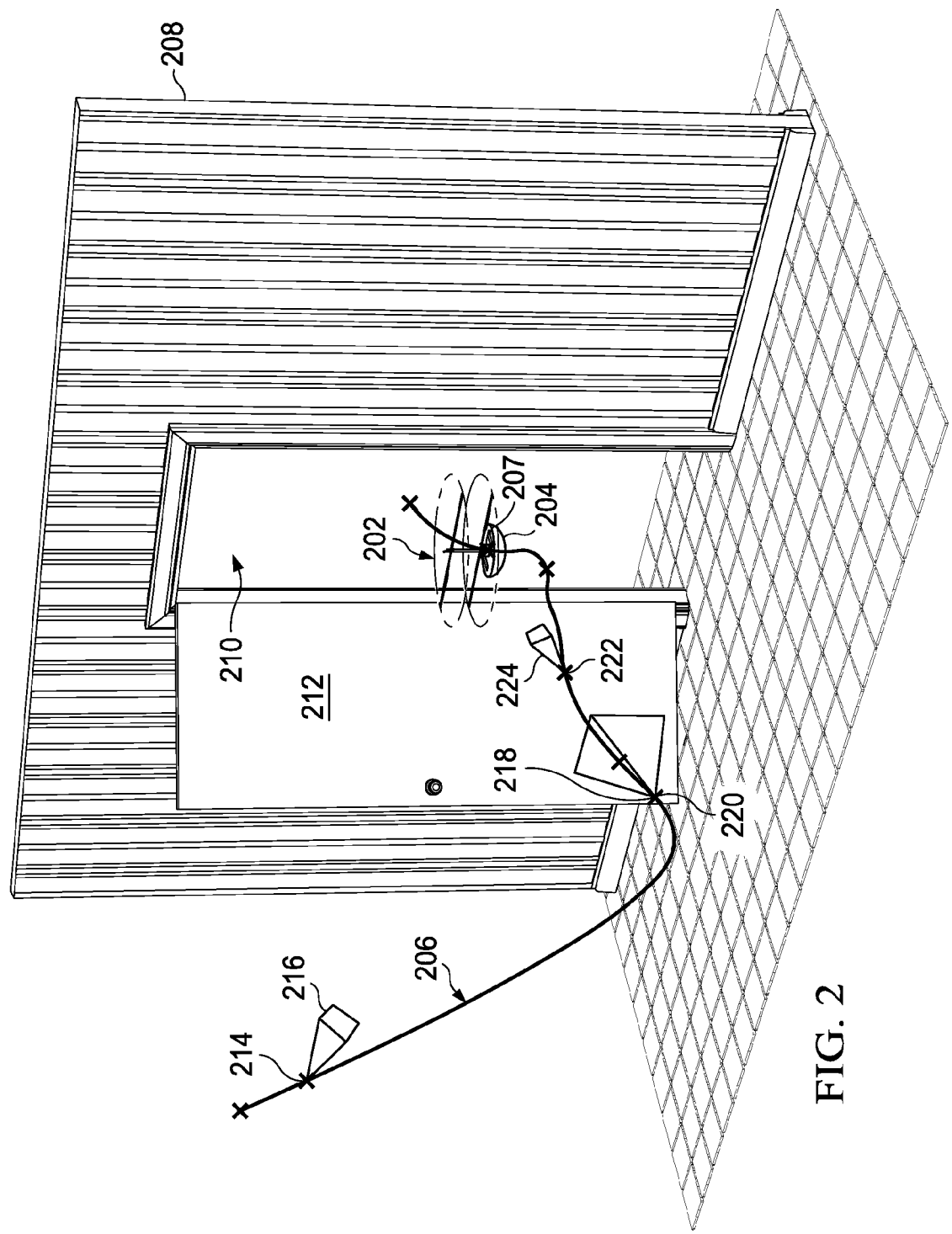
FIG. 2 is an illustration of a vehicle operating near objects in accordance with an advantageous embodiment.

With reference now to FIG. 2, an illustration of a vehicle operating near objects is depicted in accordance with an advantageous embodiment. In this illustrative example, unmanned aerial vehicle 202 is an example of one implementation for unmanned aerial vehicle 108 in FIG. 1. In particular, unmanned aerial vehicle 202 takes the form of helicopter 204.

Unmanned aerial vehicle 202 is operated remotely by an operator, such as operator 114 using computer system 116 in FIG. 1. In this illustrative example, helicopter 204 travels along path 206 and is currently at current position 207. Path 206 is an example of path 159 in FIG. 1.

As depicted, helicopter 204 flies near wall 208. Wall 208 has doorway 210 with door 212. These objects are examples of object 156 in FIG. 1.

In this illustrative example, the operator desires to move helicopter 204 around door 212 through doorway 210 in wall 208. In aiding an operator to move helicopter 204 through doorway 210, an image generated when helicopter 204 was at position 214 may be used to provide an artificial point of view to the operator.

In this illustrative example, point of view 216 is present for an image taken at position 214. Point of view 216 may be used to generate artificial point of view 150 in FIG. 1 for an operator controlling helicopter 204. Position 218 is another position at which an image may be used to generate an artificial point of view. The artificial point of view is generated using point of view 220 of the camera at position 218.

At position 222, point of view 224 is present for images taken at position 222. This position is another position at which an artificial point of view may be generated for helicopter 204.

In these illustrative examples, position 214, position 218, and position 222 on path 206 are examples of number of positions 158 for path 159 in FIG. 1.

In these illustrative examples, the images generated at position 214, position 218, and position 222 are a number of prior images taken at a prior point in time to current position 207 on path 206 for helicopter 204. The identification of position 214, position 218, and position 222 may be identified using a location system, such as location system 124 in FIG. 1.

Figure 3:
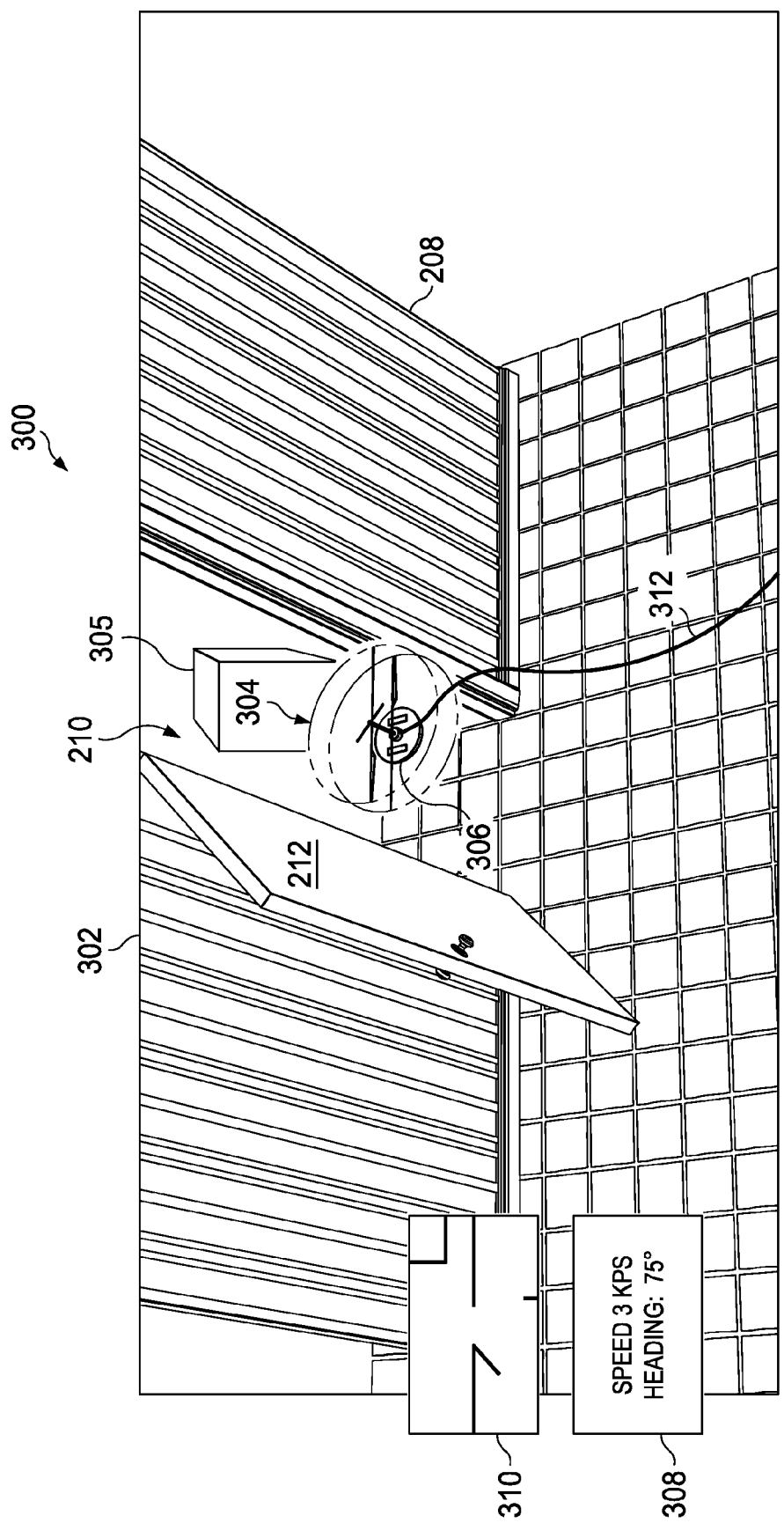
FIG. 3 is an illustration of a display from an artificial point of view in accordance with an advantageous embodiment.

With reference now to FIG. 3, an illustration of a display from an artificial point of view is depicted in accordance with an advantageous embodiment. In this illustrative example, display 300 is an example of display 161 that may be displayed on display device 162 in computer system 116 in FIG. 1. Display 300 is an example of one manner in which artificial point of view 150 may be generated for operator 114 in FIG. 1.

Display 300 is generated from an image taken at position 214 in FIG. 2. Display 300 has a point of view similar to point of view 216 for the camera at position 214 in FIG. 2. This point of view for display 300 is one illustrative example of artificial point of view 150 in FIG. 1.

In this illustrative example, display 300 includes image 302. Image 302 is generated at a prior point in time when helicopter 204 is at position 214 in FIG. 2. Image 302 has point of view 216 for the camera when helicopter 204 is at position 214 in FIG. 2. In other words, image 300 provides a view from point of view 216 in FIG. 2. Box 305 is seen in doorway 210 in this view.

In this illustrative example, an artificial point of view is generated with model 304 being added to or included in image 302. Model 304 is a model of helicopter 204 in FIG. 2.

Model 304 is displayed at location 306 in image 302. Location 306 is selected to correspond to current position 207 of helicopter 204 in FIG. 2.

Further, model 304 is displayed with a size that is scaled to the size of wall 208, doorway 210, and door 212 in image 302. This scale is based on the actual dimension of wall 208, doorway 210, door 212, and helicopter 204 in FIG. 2. Also, model 304 is displayed with an orientation that reflects the current orientation of helicopter 204 in FIG. 2. This size and orientation is in contrast to the position that helicopter 204 had when image 302 was generated by the camera. In these examples, the position includes the location in three-dimensional space and an orientation of helicopter 204 in FIG. 2.

Moreover, display 300 may include additional information for operating the vehicle. For example, vehicle information 308 may be included. Vehicle information 308, in this illustrative example, includes speed and heading. As another example, map 310 also may be displayed on image 302. Map 310 may be a map of the building in which wall 208, doorway 210, and door 212 are present. As another example, path 312 may be displayed for helicopter 204 in image 302. Path 312 may include the path already traveled by helicopter 204, as well as a projected path for helicopter 204 in FIG. 2.

Figure 4:
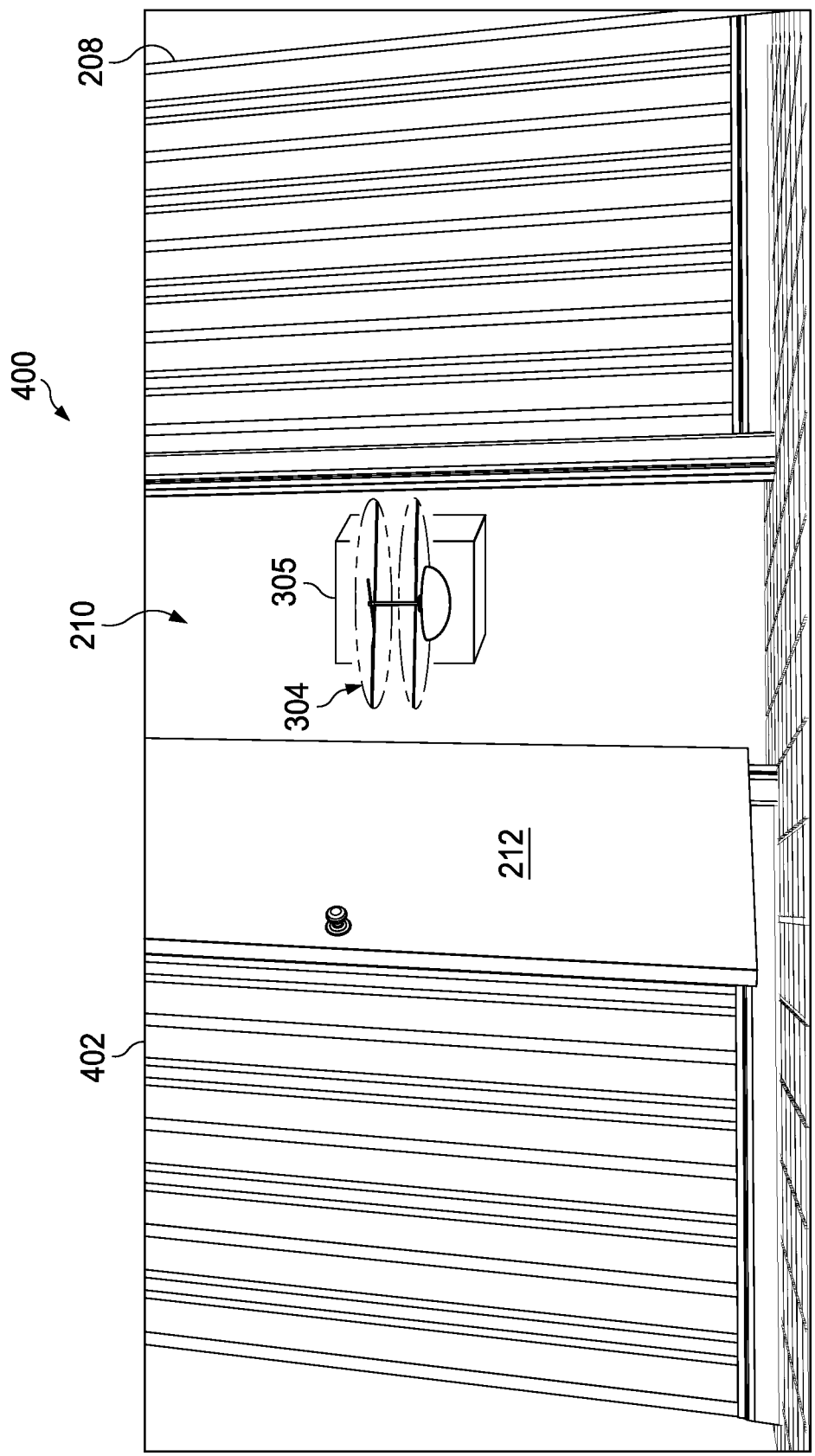
FIG. 4 is another illustration of a display from an artificial point of view in accordance with an advantageous embodiment.

With reference now to FIG. 4, another illustration of a display from an artificial point of view is depicted in accordance with an advantageous embodiment. Display 400 is an example of display 161 that may be displayed on display device 162 in computer system 116 in FIG. 1.

In this illustrative example, display 400 includes image 402. Image 402 is generated when helicopter 204 is at position 218 in FIG. 2. Image 402 has point of view 220 of the camera in helicopter 204 when the camera is at position 218 in FIG. 2. In this illustrative example, image 402 provides a view from an artificial point of view generated by adding model 304 to image 402.

In this example, model 304 has a different size from model 304 as displayed in image 302 in display 300 in FIG. 3. As depicted, model 304 has a size that is substantially accurate with respect to the scale for wall 208, doorway 210, and door 212 as show in image 402 relative to the actual dimensions and sizes for these objects.

Figure 5:
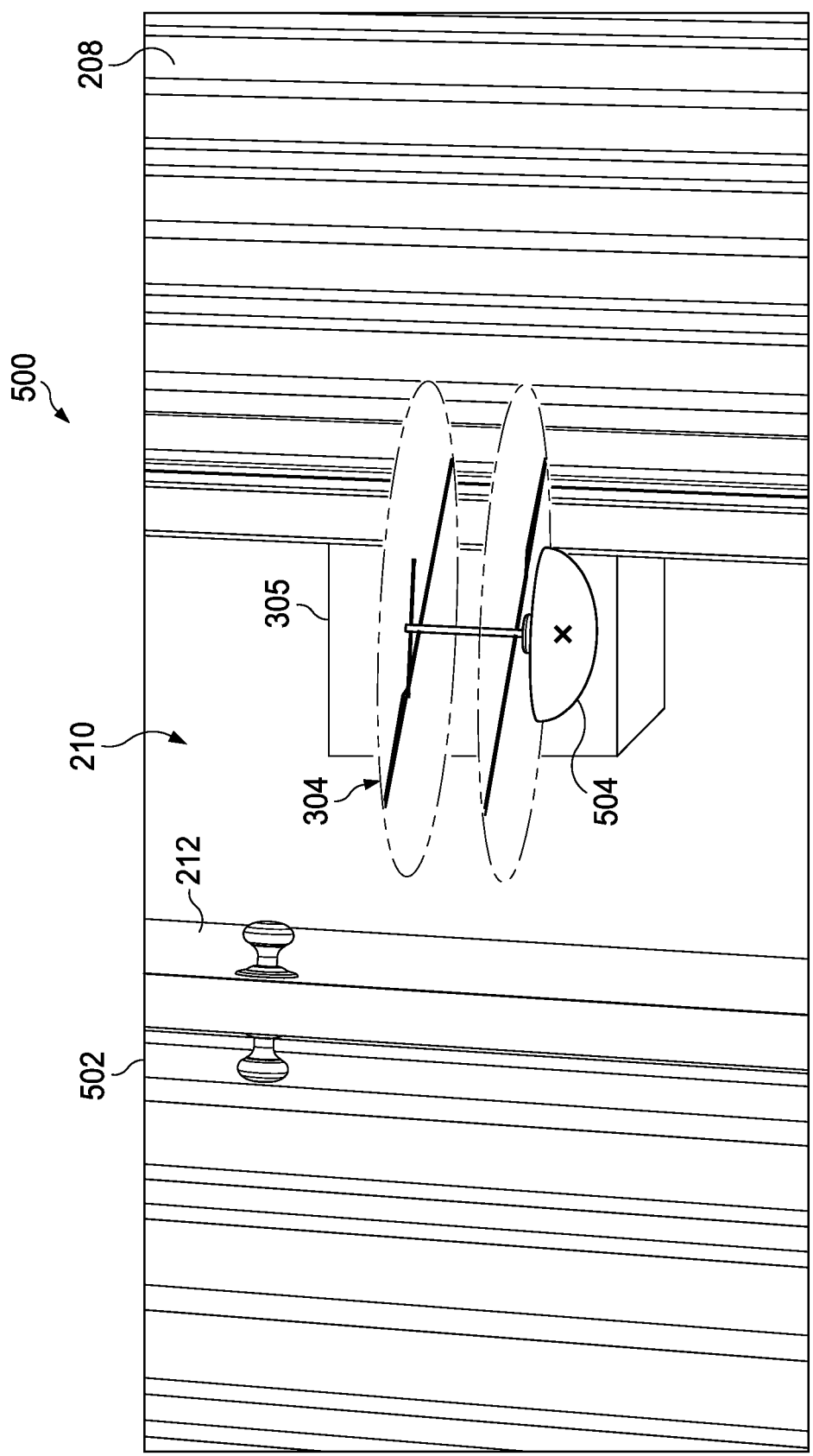
FIG. 5 is an illustration of yet another display from an artificial point of view in accordance with an advantageous embodiment.

With reference now to FIG. 5, an illustration of yet another display from an artificial point of view is depicted in accordance with an advantageous embodiment. Display 500 is an example of display 161 that may be displayed on display device 162 in computer system 116 in FIG. 1.

In this illustrative example, display 500 is generated using image 502. Image 502 is generated at position 222 in FIG. 2. Image 502 provides a view from point of view 224 of the camera when helicopter 204 was at position 222 in FIG. 2. Model 304 is displayed in location 504 in image 502.

Figure 6:
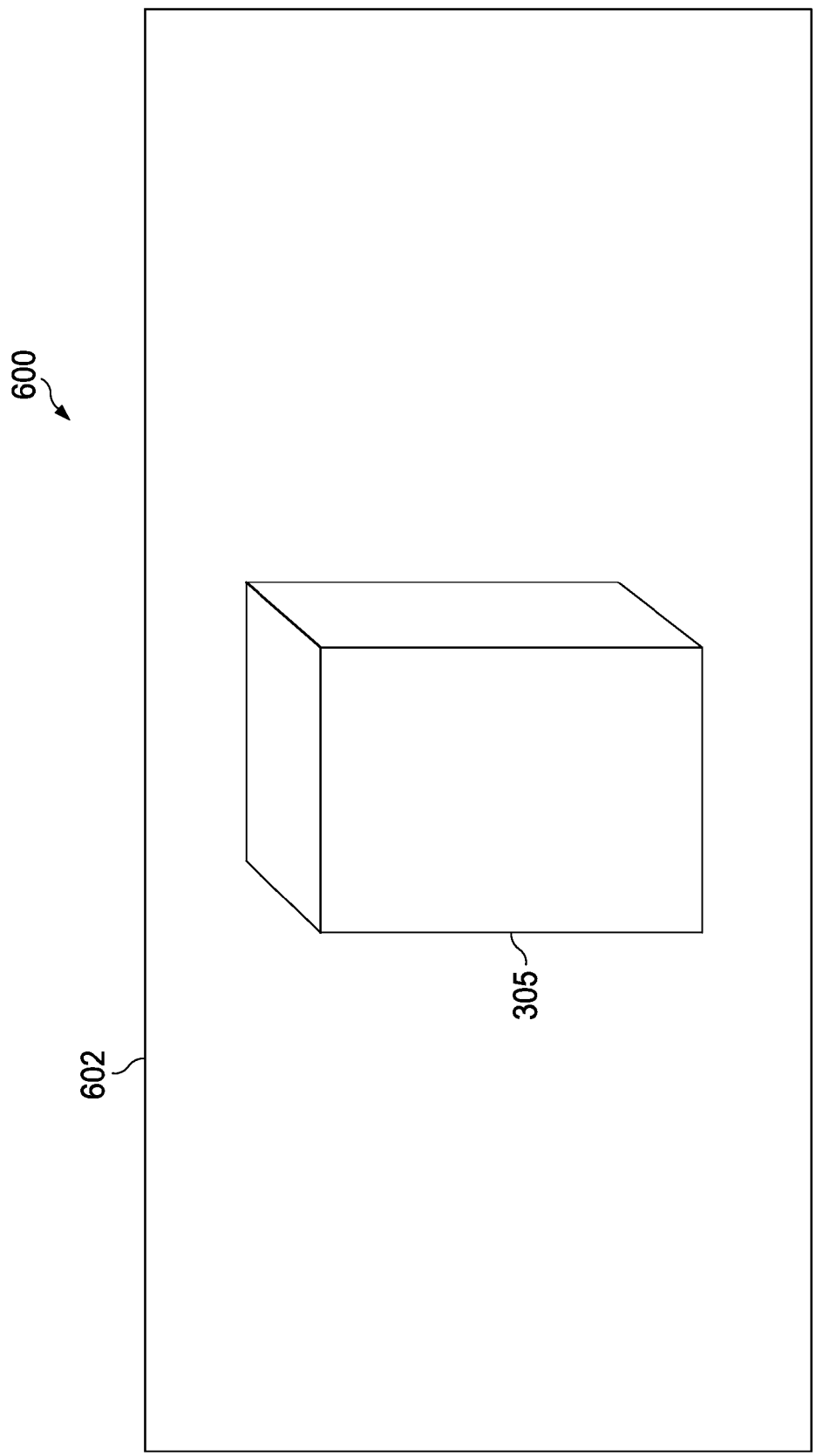
FIG. 6 is an illustration of a display in accordance with an advantageous embodiment.

With reference now to FIG. 6, an illustration of a display is depicted in accordance with an advantageous embodiment. In this illustrative example, display 600 is another example of display 161 in FIG. 1. Display 600 includes image 602.

Image 602 is at current position 207 for helicopter 204 in FIG. 2. At current position 207, the operator is unable to obtain as much information about doorway 210 to travel through doorway 210 in FIG. 2. For example, the operator is able to see box 305 through doorway 210 but is unable to see the edges of doorway 210 in FIG. 2. In the illustrative examples, display 600 may be used in conjunction with the other displays illustrated to provide information to operator 114 to control helicopter 204 in FIG. 2.

In one illustrative example, point of view module 148 in FIG. 1 may provide displays with different points of view that may transition in a sequence of displays, such as those in display 300 in FIG. 3, display 400 in FIG. 4, display 500 in FIG. 5, and display 600 in FIG. 6. In this manner, a progression of different artificial points of view may be displayed. Of course, more images may be used to provide a smoother transition between different artificial points of view up to the current point of view of helicopter 204.

In some cases, the artificial point of view may be shifted with respect to whether the model is centered in the image. For example, if the camera has a field of view that does not include the center of where the helicopter is currently located, the model may be shown such that the model is not in the center of the image. The field of view is the view of what the camera can see.

Figure 7:
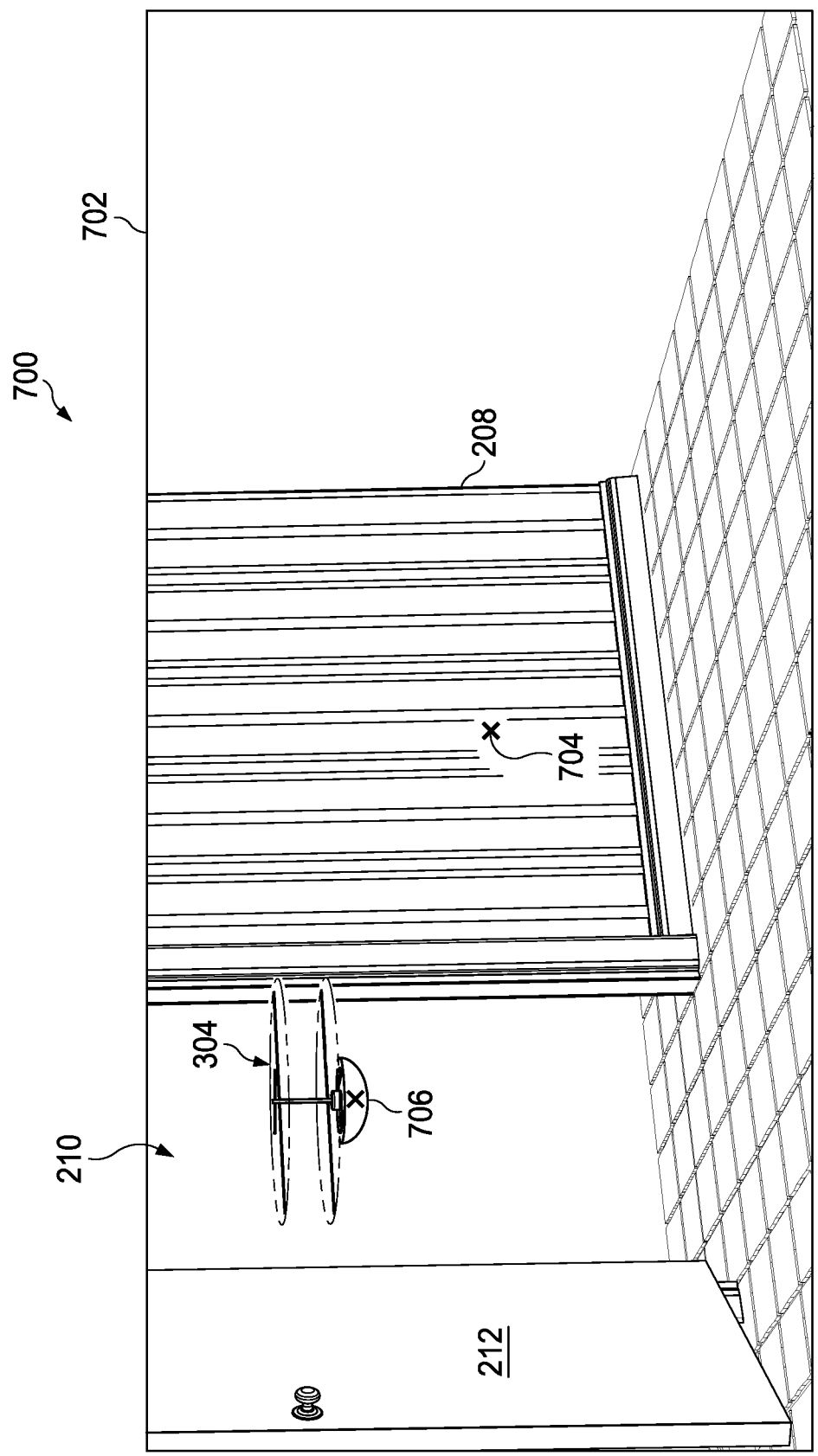
FIG. 7 is an illustration of a display of an artificial point of view with a non-centered model in accordance with an advantageous embodiment.

With reference now to FIG. 7, an illustration of a display of an artificial point of view with a non-centered model is depicted in accordance with an advantageous embodiment. In this illustrative example, display 700 is generated using image 702.

As can be seen, image 702 is taken when the camera was pointed such that doorway 210 was not in the center of image 702. As a result, model 304 is not displayed at center 704 of image 702. Although image 702 may not provide as desirable a view when generating an artificial point of view, display 700 still provides situational awareness information for the operator.

In other words, the operator is still able to see model 304 as displayed in location 706 in image 702 with a size that is scaled to the actual size of helicopter 204 in FIG. 2 relative to the actual doorway. Further, the orientation of model 304 also matches the current orientation of helicopter 204. In this manner, an operator may still have sufficient information about the environment around helicopter 204 to move helicopter 204 through doorway 210 without touching doorway 210.

In some illustrative examples, the camera may be pointed at the object that is of interest to the operator for moving the vehicle. For example, in some cases, the camera may be adjustable to always point at a particular object, such as a doorway.

With this type of implementation, the object is always in the center of the frame. However, the model may not always be displayed at the center of the frame based on the current position of the vehicle relative to the point of view from which the image was taken.

Figure 8:
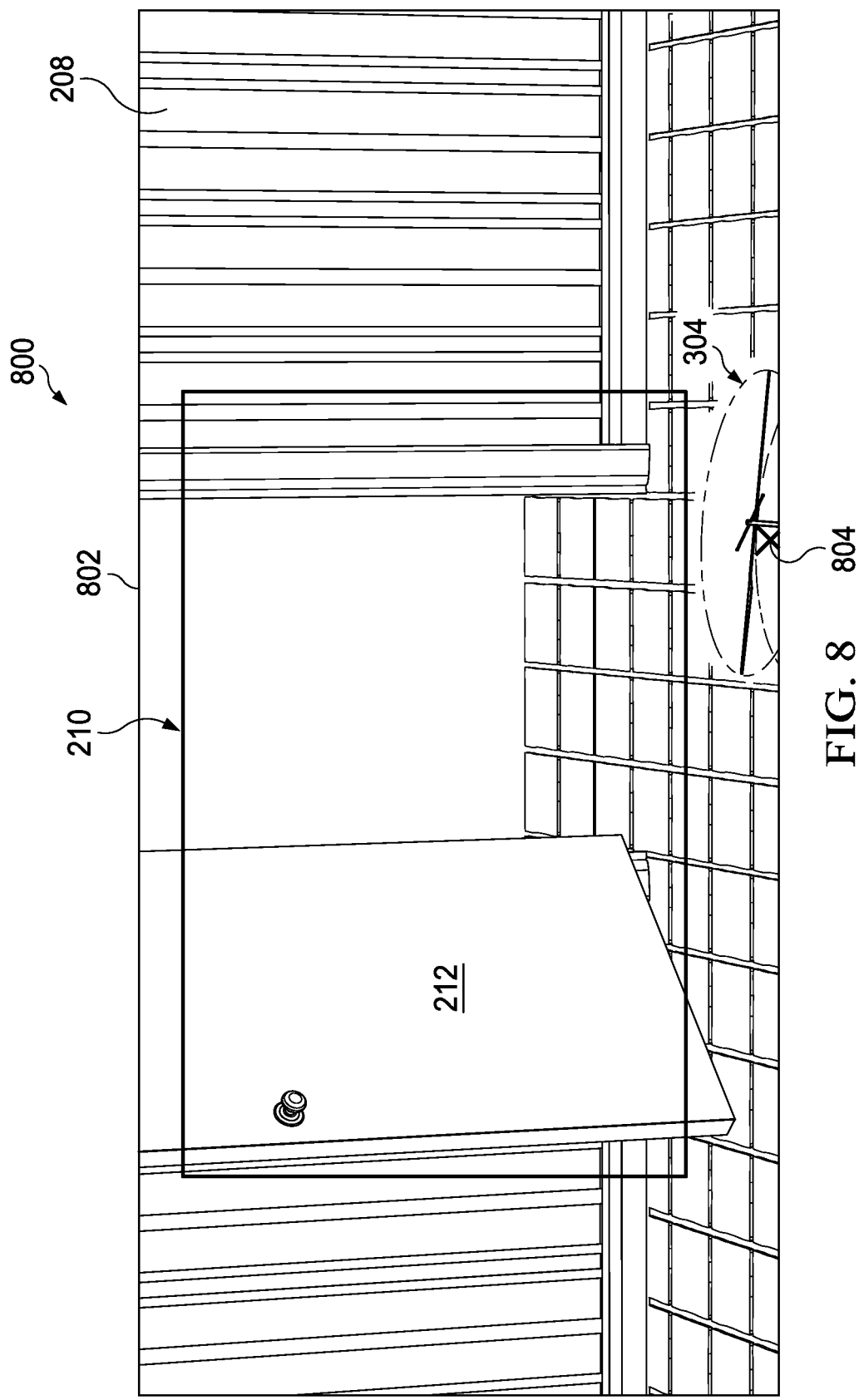
FIG. 8 is an illustration of another display of an artificial point of view in accordance with an advantageous embodiment.

With reference now to FIG. 8, an illustration of another display of an artificial point of view is depicted in accordance with an advantageous embodiment. In this illustrative example, display 800 includes image 802. Image 802 is generated by a camera pointed at doorway 210 during the path of helicopter 204 in FIG. 2 to doorway 210. In other words, the camera remains pointed at doorway 210 even if the front of helicopter 204 in FIG. 2 is not pointed at doorway 210.

In this illustrative example, doorway 210 is centered in image 802. Model 304 of helicopter 204 in FIG. 2 is not centered. Instead, model 304 is displayed in location 804 with a size that is scaled relative to the size of the objects shown in the image. Although model 304 is not shown in the center of image 802, display 800 still provides information about the environment around helicopter 204 that may be used by an operator to maneuver helicopter 204 in FIG. 2.

Figure 9:
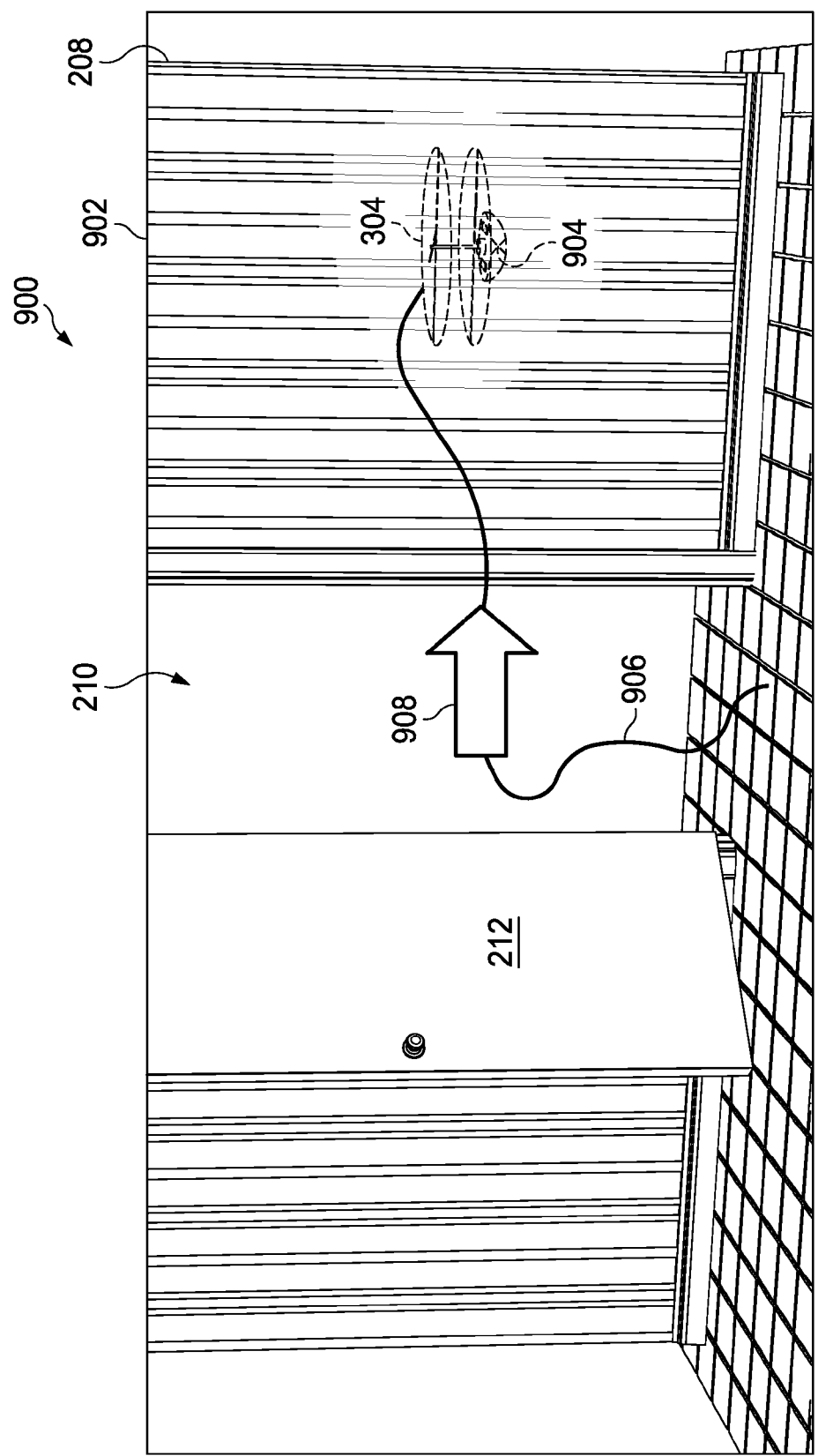
FIG. 9 is an illustration of a display with an artificial point of view with the unmanned aerial vehicle hidden from view in accordance with an advantageous embodiment.

With reference now to FIG. 9, an illustration of a display with an artificial point of view with the unmanned aerial vehicle hidden from view is depicted in accordance with an advantageous embodiment. In this illustrative example, display 900 is generated using image 902. In this example, model 304 is included in image 902 at location 904.

In this particular example, model 304 is behind an object, wall 208, and is not actually visible in image 902 in the current location.

In this illustrative example, model 304 is shown as being behind wall 208. Although model 304 cannot be actually seen in image 902, model 304 is displayed in image 902 in a manner indicating that model 304 is behind wall 208. For example, model 304 may be displayed in phantom, with a flashing indicator, or in some other manner that allows the viewer to know that model 304 is actually behind wall 208.

Helicopter 204 in FIG. 2 has moved through doorway 210 and is located behind wall 208 in image 902. Image 902 is taken from a prior point of view before helicopter 204 in FIG. 2 is moved through doorway 210.

In this illustrative example, model 304 is displayed in location 904 that corresponds to a current position of helicopter 204 in FIG. 2. Additionally, path 906 may be included in image 902. Further, arrow 908 may indicate a direction of travel of helicopter 204 in FIG. 2. Further, the speed of helicopter 204 in FIG. 2 may be indicated by the size of arrow 908. For example, arrow 908 may be longer or larger in other dimensions if helicopter 204 is moving faster than in the current example.

The illustrations of the displays in FIGS. 3-9 are not meant to limit the manner in which other displays may be generated. Further, the different components shown in FIGS. 2-9 may be combined with components in FIG. 1, used with components in FIG. 1, or a combination of the two. Additionally, some of the components in FIGS. 2-9 may be illustrative examples of how components shown in block form in FIG. 1 may be implemented as physical structures.

In other illustrative examples, other types of information may be included in addition to and/or in place of the ones depicted in these displays. In some illustrative examples, a projected path of helicopter 204 in FIG. 2 may be included in the display of model 304. In other illustrative examples, a path may be displayed in an image to show where the vehicle has been and its path of travel. As still another illustrative example, if a target of interest is selected, the distance to the target of interest may be displayed on the images.

In still other illustrative examples, the model may be a geometric shape that has dimensions that are scaled for the vehicle rather than a more accurate model that is displayed for model 304.

Figure 10:
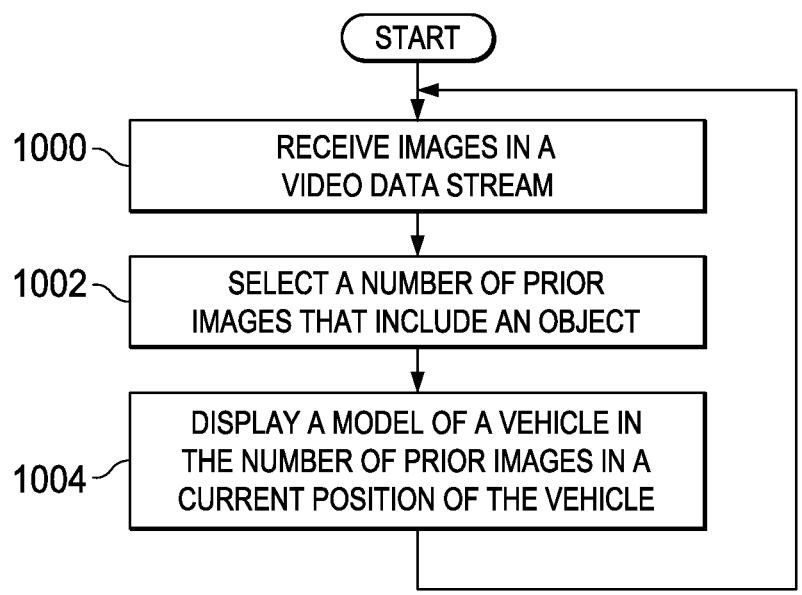
FIG. 10 is an illustration of a flowchart of a process for processing video information for a vehicle in accordance with an advantageous embodiment.

With reference now to FIG. 10, an illustration of a flowchart of a process for processing video information for a vehicle is depicted in accordance with an advantageous embodiment. The process illustrated in FIG. 10 may be implemented in point of view module 148 in FIG. 1. The vehicle may take the form of, for example, without limitation, a ground vehicle, a ship, a submarine, an aircraft, a helicopter, an unmanned aerial vehicle, a spacecraft, or some other suitable type of vehicle.

In this illustrative example, the process begins by receiving images in a video data stream (1000). The process selects a number of prior images that include an object (operation 1002). The process displays a model of a vehicle in the number of prior images in a current position of the vehicle (operation 1004), with the process returning to operation 1000. The model is displayed in the number of prior images with a size that is based on the current position of the vehicle relative to the object in the number of prior images. In other words, the position and size of the vehicle are based on the current position of the vehicle relative to an object.

With this display, an operator of a vehicle may have more information to operate the vehicle. For example, the operator may be able to see the amount of clearance or space between the vehicle and an object that may be near the vehicle. In this manner, the operator may be able to move the vehicle around the object, through the object, or into the object as desired.

Figure 11:
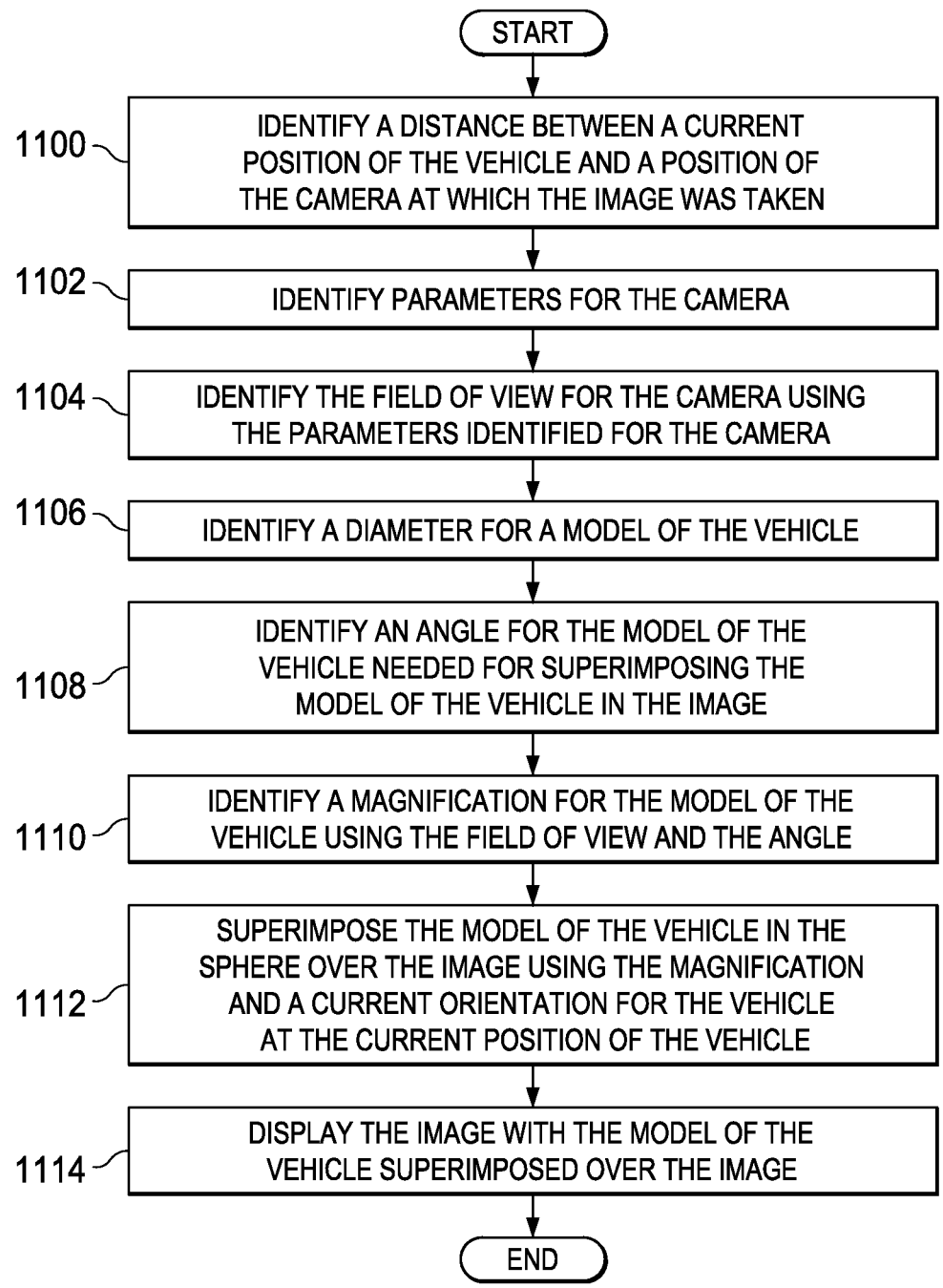
FIG. 11 is an illustration of a flowchart of a process for displaying a model of a vehicle in an image in accordance with an advantageous embodiment.

With reference now to FIG. 11, an illustration of a flowchart of a process for displaying a model of a vehicle in an image is depicted in accordance with an advantageous embodiment. The process illustrated in FIG. 11 includes operations that may be performed as part of operation 1004 in FIG. 10.

The process begins by identifying a distance between a current position of the vehicle and a position of the camera at which the image was taken (operation 1100). The position of the camera may be described in three-dimensional coordinates and also may include an orientation of the camera.

Next, the process identifies parameters for the camera (operation 1102). These parameters may include, for example, a focal length, an image size, and other suitable parameters. The focal length and the image size may be fixed parameters for the camera. As one illustrative example, the focal length may be fixed at about 20 millimeters.

The process then identifies the field of view for the camera using the parameters identified for the camera (operation 1104). For example, the field of view may be calculated using the following equation:

$$fov = 2*(\arctan((S/2)/f))$$

where fov is the field of view, S is the image size, f is the focal length, and arctan is the inverse of the tangent function.

Next, the process identifies a diameter for a model of the vehicle (operation 1106). This diameter may be for the minimum size sphere in which the vehicle can be inscribed or placed. The model is a three-dimensional model of the vehicle. For example, the model of the vehicle may be in a sphere in which the diameter for the model is a maximum dimension for the model of the vehicle in any axis. The model of the vehicle has substantially the same dimensions as the actual vehicle.

Thereafter, the process identifies an angle for the model of the vehicle needed for superimposing the model of the vehicle in the image (operation 1108). In operation 1108, this angle may be identified using the following equation:

$$\theta = \arctan(D/L)$$

where θ is the angle for the model of the vehicle, D is the diameter identified for the model of the vehicle, and L is the distance between the current position of the vehicle and the position of the camera at which the image was taken.

The process then identifies a magnification for the model of the vehicle using the field of view and the angle (operation 1110). In operation 1110, the magnification may be identified using the following equation:

$$M = \theta/(fov)$$

where M is the magnification for the model of the vehicle.

The process then superimposes the model of the vehicle in the sphere over the image using the magnification and a current orientation for the vehicle at the current position of the vehicle (operation 1112). Operation 1112 is performed with respect to a vertical axis and a horizontal axis for the image. Further, in operation 1112, the model of the vehicle is superimposed over the image such that the model of the vehicle in the sphere fills a correct ratio within the image based on the magnification.

The process then displays the image with the model of the vehicle superimposed over the image (operation 1114), with the process terminating thereafter. This process may be applied to any number of prior images of interest.

The process illustrated in FIG. 11 may be implemented in point of view module 148 in FIG. 1. In these illustrative examples, the process can be implemented in software, hardware, or a combination of the two. When software is used, the operations performed by the processes may be implemented in the program code configured to be run on a processor unit. When hardware is employed, the hardware may include circuits that operate to perform the operations in the processes illustrated.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be re-configured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being.

Turning now to FIG. 12, an illustration of a data processing system is depicted in accordance with an advantageous embodiment. Data processing system 1200 may be used to implement computer system 116 in FIG. 1. In this illustrative example, data processing system 1200 includes communications fabric 1202, which provides communications between processor unit 1204, memory 1206, persistent storage 1208, communications unit 1210, input/output (I/O) unit 1212, and display 1214. Data processing system 1200 is an example of a data processing system that may be used to implement computer system 116.

Processor unit 1204 serves to execute instructions for software that may be loaded into memory 1206. Processor unit 1204 may be a number of processors, a multi-processor core, or some other type of processor, depending on the particular implementation. A number, as used herein with reference to an item, means one or more items. Further, processor unit 1204 may be implemented using a number of heterogeneous processor systems in which a main processor is present with secondary processors on a single chip. As another illustrative example, processor unit 1204 may be a symmetric multi-processor system containing multiple processors of the same type.

Memory 1206 and persistent storage 1208 are examples of storage devices 1216. A storage device is any piece of hardware that is capable of storing information, such as, for example, without limitation, data, program code in functional form, and/or other suitable information either on a temporary basis and/or a permanent basis. Storage devices 1216 may also be referred to as computer readable storage devices in these examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these examples, provides for communications with other data processing systems or devices. In these examples, communications unit 1210 is a network interface card. Communications unit 1210 may provide communications through the use of either or both physical and wireless communications links.

Input/output unit 1212 allows for input and output of data with other devices that may be connected to data processing system 1200. For example, input/output unit 1212 may provide a connection for user input through a keyboard, a mouse, and/or some other suitable input device. Further, input/output unit 1212 may send output to a printer. Display 1214 provides a mechanism to display information to a user.

Instructions for the operating system, applications, and/or programs may be located in storage devices 1216, which are in communication with processor unit 1204 through communications fabric 1202. In these illustrative examples, the instructions are in a functional form on persistent storage 1208. These instructions may be loaded into memory 1206 for execution by processor unit 1204. The processes of the different embodiments may be performed by processor unit 1204 using computer-implemented instructions, which may be located in a memory, such as memory 1206.

These instructions are referred to as program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these examples. In one example, computer readable media 1220 may be computer readable storage media 1224 or computer readable signal media 1226. Computer readable storage media 1224 may include, for example, an optical or magnetic disk that is inserted or placed into a drive or other device that is part of persistent storage 1208 for transfer onto a storage device, such as a hard drive, that is part of persistent storage 1208.

Computer readable storage media 1224 also may take the form of a persistent storage, such as a hard drive, a thumb drive, or a flash memory, that is connected to data processing system 1200. In some instances, computer readable storage media 1224 may not be removable from data processing system 1200. In these examples, computer readable storage media 1224 is a physical or tangible storage device used to store program code 1218 rather than a medium that propagates or transmits program code 1218. Computer readable storage media 1224 is also referred to as a computer readable tangible storage device or a computer readable physical storage device. In other words, computer readable storage media 1224 is a media that can be touched by a person.

Alternatively, program code 1218 may be transferred to data processing system 1200 using computer readable signal media 1226. Computer readable signal media 1226 may be, for example, a propagated data signal containing program code 1218. For example, computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 1218 may be downloaded over a network to persistent storage 1208 from another device or data processing system through computer readable signal media 1226 for use within data processing system 1200. For instance, program code stored in a computer readable storage medium in a server data processing system may be downloaded over a network from the server to data processing system 1200. The data processing system providing program code 1218 may be a server computer, a client computer, or some other device capable of storing and transmitting program code 1218.

The different components illustrated for data processing system 1200 are not meant to provide architectural limitations to the manner in which different embodiments may be implemented. The different advantageous embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1204 may take the form of a hardware unit that has circuits that are manufactured or configured for a particular use. This type of hardware may perform operations without needing program code to be loaded into a memory from a storage device to be configured to perform the operations.

For example, when processor unit 1204 takes the form of a hardware unit, processor unit 1204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1218 may be omitted, because the processes for the different embodiments are implemented in a hardware unit.

In still another illustrative example, processor unit 1204 may be implemented using a combination of processors found in computers and hardware units. Processor unit 1204 may have a number of hardware units and a number of processors that are configured to run program code 1218. With this depicted example, some of the processes may be implemented in the number of hardware units, while other processes may be implemented in the number of processors.

In another example, a bus system may be used to implement communications fabric 1202 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1206, or a cache, such as found in an interface and memory controller hub that may be present in communications fabric 1202.

Thus, the different advantageous embodiments provide a method and apparatus for processing video information for a vehicle. In processing the video information, a number of prior images are selected that include an area of interest around the vehicle. A model of the vehicle is displayed in the number of prior images in the current position of the vehicle. Further, the model has a size that is based on the current position of the vehicle relative to an object in the number of prior images.

In this manner, the different advantageous embodiments may provide an operator more information to operate a vehicle than is currently available. With an artificial point of view, the operator may see the vehicle in its current position relative to an object that cannot be seen from the current point of view of the camera in the vehicle at the vehicle's current position. As a result, an operator may be more easily able to maneuver a vehicle around, through, under, or into an object.

The description of the different advantageous embodiments has been presented for purposes of illustration and description and is not intended to be exhaustive or limited to the embodiments in the form disclosed. Many modifications and variations will be apparent to those of ordinary skill in the art. For example, although the illustrative examples have been described with respect to a helicopter, the advantageous embodiments may be applied to other types of vehicles. For example, the different advantageous embodiments may be applied to unmanned ground vehicles, manned ground vehicles, tanks, cars, submarines, surface ships, spacecraft, and other suitable vehicles.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for processing video information for a vehicle, the method comprising:
    selecting a number of prior images from images generated by the vehicle, wherein an object is seen in the number of prior images; and
    displaying a model of the vehicle in the number of prior images generated by the vehicle in a current position of the vehicle and with a size that is based on the current position of the vehicle relative to the object in the number of prior images;
    wherein displaying the model further includes indicating the model of the vehicle in phantom in the number of prior images generated by the vehicle when the current position of the vehicle is hidden from view by the object, wherein the current position of the vehicle is determined from position information generated by a location system onboard the vehicle, the location system comprising at least one of a global positioning system receiver, an accelerometer, and an inertial measurement unit.

2. The method of claim 1, wherein displaying the model further comprises:
    identifying the current position of the vehicle;
    identifying a number of locations in the number of prior images for the vehicle based on the current position of the vehicle;
    adding the model of the vehicle to the number of prior images in the number of locations identified with the size that is based on the current position of the vehicle relative to the object to form a number of modified images; and
    displaying the number of modified images.

3. The method of claim 2, wherein adding the model of the vehicle to the number of prior images in the number of locations identified to form the number of modified images comprises:
    adding the model of the vehicle to the number of prior images in the number of locations identified with the model having an orientation based on the current position of the vehicle to form the number of modified images.

4. The method of claim 2, wherein adding the model of the vehicle to the number of prior images in the number of locations identified to form the number of modified images comprises:
    identifying the number of locations in the number of prior images for the vehicle based on the current position of the vehicle; and
    selecting the size for the model such that the size for the model has a proportion relative to the object in the number of prior images that substantially matches an actual physical proportion of the vehicle to the object.

5. The method of claim 1 further comprising:
    generating the number of prior images as the vehicle moves through a number of locations along a path towards the object.

6. The method of claim 1 further comprising:
    performing the steps of selecting the number of prior images from the images generated by the vehicle, wherein the object is seen in the number of prior images and displaying the model of the vehicle in the number of prior images in the current position of the vehicle and with the size that is based on the current position of the vehicle relative to the object in the number of prior images for at least one of a number of locations to form a number of displays with a number of artificial points of view.

7. The method of claim 6 further comprising:
    changing a point of view displayed in sequence between a location in the number of locations to the current position.

8. The method of claim 1, wherein the current position comprises coordinates describing a location of the vehicle in a three-dimensional space and an orientation of the vehicle.

9. The method of claim 8, wherein the current position further comprises a velocity of the vehicle.

10. The method of claim 1, wherein the vehicle is selected from one of a ground vehicle, a ship, a submarine, an aircraft, a helicopter, an unmanned aerial vehicle, and a spacecraft.

11. An apparatus comprising:
    a display device; and
    a computer system configured to select a number of prior images from images generated by a vehicle, wherein an object is seen in the number of prior images and display a model of the vehicle in the number of prior images generated by the vehicle in a current position of the vehicle and with a size that is based on the current position of the vehicle relative to the object in the number of prior images, the computer system being further configured to display the model of the vehicle in phantom in the number of prior images generated by the vehicle when the current position of the vehicle is hidden from view by the object, wherein the current position of the vehicle is determined from position information generated by a location system onboard the vehicle, the location system comprising at least one of a global positioning system receiver, an accelerometer, and an inertial measurement unit.

12. The apparatus of claim 11, wherein in being configured to display the model of the vehicle in the number of prior images in the current position of the vehicle and with the size that is based on the current position of the vehicle relative to the object in the number of prior images, the computer system is configured to identify the current position of the vehicle; identify a number of locations in the number of prior images for the vehicle based on the current position of the vehicle; add the model of the vehicle to the number of prior images in the number of locations identified with the size that is based on the current position of the vehicle relative to the object to form a number of modified images; and display the number of modified images.

13. The apparatus of claim 12, wherein in being configured to add the model of the vehicle to the number of prior images in the number of locations identified to form the number of modified images, the computer system is configured to add the model of the vehicle to the number of prior images in the number of locations identified with the model having an orientation based on the current position of the vehicle to form the number of modified images.

14. The apparatus of claim 12, wherein in being configured to add the model of the vehicle to the number of prior images in the number of locations identified to form the number of modified images, the computer system is configured to identify the number of locations in the number of prior images for the vehicle based on the current position of the vehicle and select the size for the model to provide a relative distance between the model and the object in the number of prior images.

15. The apparatus of claim 11, wherein the computer system is further configured to generate the number of prior images as the vehicle moves through a number of locations along a path towards the object.

16. The apparatus of claim 11, wherein the computer system is further configured to select the number of prior images from the images generated by the vehicle, wherein the object is seen in the number of prior images and display the model of the vehicle in the number of prior images in the current position of the vehicle and with the size that is based on the current position of the vehicle relative to the object in the number of prior images for at least one of a number of locations to form a number of displays with a number of artificial points of view.

17. The apparatus of claim 16, wherein the computer system is further configured to change a point of view displayed in sequence between a location in the number of locations to the current position.

18. A non-transitory computer program product comprising:
a computer readable storage medium;
first program code for selecting a number of prior images from images generated by a vehicle, wherein an object is seen in the number of prior images; and
second program code for displaying a model of the vehicle in the number of prior images generated by the vehicle in a current position of the vehicle and with a size that is based on the current position of the vehicle relative to the object in the number of prior images, the second program code comprising program code for displaying the model of the vehicle in phantom in the number of prior images generated by the vehicle when the current position of the vehicle is hidden from view by the object, wherein the current position of the vehicle is determined from position information generated by a location system onboard the vehicle, the location system comprising at least one of a global positioning system receiver, an accelerometer, and an inertial measurement unit, wherein the first program code and the second program code are stored on the computer readable storage medium.

19. The non-transitory computer program product of claim 18, wherein the second program code further comprises:
program code for identifying the current position of the vehicle;
program code for identifying a number of locations in the number of prior images for the vehicle based on the current position of the vehicle;
program code for adding the model of the vehicle to the number of prior images in the number of locations identified with the size based on the current position of the vehicle relative to the object to form a number of modified images; and
program code for displaying the number of modified images.

* * * * *